United States Patent [19]

Troutner et al.

[11] Patent Number: 4,776,919

[45] Date of Patent: Oct. 11, 1988

[54] LAMINATED LUMBER PRESS APPARATUS

[75] Inventors: Arthur L. Troutner, Boise; Don C. Stockett, Kuna, both of Id.

[73] Assignee: Trus Joist Corporation, Boise, Id.

[21] Appl. No.: 822,130

[22] Filed: Jan. 24, 1986

[51] Int. Cl.[4] ........................ B30B 15/30; B30B 15/34; B32B 31/12; B32B 31/20

[52] U.S. Cl. .................................... 156/499; 156/558; 156/563; 156/566; 156/578; 156/583.1; 100/93 P

[58] Field of Search ............... 156/499, 558, 559, 563, 156/566, 580, 583.1, 583.6, 578; 100/93 P

[56] References Cited

U.S. PATENT DOCUMENTS

| | | | |
|---|---|---|---|
| 2,887,425 | 5/1959 | Holland | 154/122 |
| 3,580,794 | 5/1971 | Mintz | 156/583.6 |
| 3,585,092 | 6/1971 | Storer | 156/580 |
| 3,619,321 | 11/1971 | Lewis | 156/249 |
| 3,704,883 | 12/1972 | Don | 271/72 |
| 4,212,699 | 7/1980 | Braunschweiler | 156/558 |
| 4,314,871 | 2/1982 | Weinstock | 156/258 |

*Primary Examiner*—Michael W. Ball
*Assistant Examiner*—J. Davis
*Attorney, Agent, or Firm*—Klarquist, Sparkman, Campbell, Leigh & Whinston

[57] ABSTRACT

Laminated lumber press apparatus is described including a plurality of press sections each having a lower press platen and an upper press platen of adjustable height which are spaced apart for receiving lumber members therebetween and pressing such lumber members together during gluing to produce laminated lumber of different thicknesses. Side clamp devices are employed for clamping the opposite side edges of lumber members and holding them in a raised position above the lower platen so they can be glued to another lumber member supported on such platen. The side clamp includes a pair of jaw members which are moved laterally on carriages into engagement with the sides of a lumber member, such carriages being coupled together by rack and pinion gearing. Before being conveyed into the press sections, the lumber members are heated on one side and fed into a board turner apparatus so that the heated lower side of such board member is inverted into an upper position where glue can be applied thereto. After they are conveyed into the press sections the lower press members then move the glue coated lumber members upward into contact with the previous lumber members held by the side clamps and are maintained in the raised position until the lumber members are glued together to form a laminated lumber member. The laminated lumber member is released from the side clamps, lowered on the lower platens and discharged from the press sections by a discharge conveyor.

11 Claims, 6 Drawing Sheets

LAMINATED LUMBER PRESS APPARATUS

BACKGROUND OF THE INVENTION

The subject matter of the present invention relates generally to laminated lumber press apparatus, and in particular to such press apparatus in which a plurality of lumber members are glued together to form laminated lumber. The press apparatus includes a plurality of press sections each having a lower press platen and an upper press platen of adjustable height which are spaced apart for receiving the lumber members and moved together to press the lumber members together during gluing. Side clamp devices are employed to engage the opposite side edges of the lumber members to hold them is a raised position while the lower platen is retracted to a lowered position for receiving another lumber member so that it can be pressed against and glued to the raised member. The upper platens are adjustable in height and may be raised in order to adjust the spacing between the platens to form laminated lumber of different thickness. In addition, a board turner apparatus of improved design is employed to turn over the lumber members after they have been heated on their down side in order to position the heated side up so that it can be coated with glue before such coated lumber members are fed into the press.

The laminated lumber press apparatus of the present invention is particularly useful in the formation of laminated lumber beams or billets of different width and different thickness by employing different size lumber members which are glued together in the press apparatus.

DISCUSSION OF PRIOR ART

It has been previously proposed in U.S. Pat. No. 4,212,699 of Braunschweiler issued July 15, 1980 to provide a wood press with a fixed upper platen and a movable lower platen which is raised by a fluid cylinder. A plurality of laterally spaced wood veneer sheets on a conveyor table are fed into the press by a moving the conveyor table between the platens. Such sheets whose edges have been coated with glue are raised by heated rails off the table and the table retracted. The wood sheets are pressed into contact with the upper platen by the lower platen to glue the edges of the sheets together. The lower platen is moved vertically upward and horizontally to press the veneer sheets against the upper platen and to move the veneer sheets laterally to cause the longitudinal edges of such sheets to be placed into contact and to be bonded to each other. Unlike the laminated lumber press apparatus of the present invention, the press apparatus of Braunschweiler has no side clamps for holding a first lumber member spaced above the lower platen while a second lumber member coated with glue is urged into engagement with and glued to the bottom side first lumber member by raising the lower platen. In addition, there is no height adjustment of the upper platen to enable the formation of laminated lumber of different thicknesses and there is no heating of the lower platen to assist in bonding, in the manner of the present invention. There is no formation of a laminated lumber member, but rather a continuous sheet or board of veneer is produced with the press apparatus of Braunschweiler.

As shown in U.S. Pat. No. 4,314,871 of Weinstock, et al issued Feb. 9, 1982, it is old to form laminated lumber by pressing a plurality of vertical lumber members together horizontally with pressure rollers and bonding them by using glued finger joints. However, there is no disclosure in this patent of a press section with an upper press platen of adjustable height and a heated lower press platen, or a side clamp mechanism which engages the sides of the lumber member to hold such lumber member in a raised position spaced above the lower platen in the manner of the present invention. U.S. Pat. No 3,619,321 of Lewis, et al issued Nov. 9, 1971 shows that it is old to preheat the surface of a wood core before applying glue in order to speed up the gluing process. However, Lewis does not show the other above-discussed features of the laminated lumber press apparatus of the present invention.

It is also old to provide a sheet turner in a manufacturing apparatus as shown in U.S. Pat. No 3,704,883 of Don issued Dec. 5, 1972 and U.S. Pat. No. 2,887,425 of Holland issued May 19, 1959. However, in neither of these patents is the pivot axis for the turner also moved horizontally in order to invert the sheet material while maintaining the sheet in the same horizontal position to conserve space, as is done in the apparatus of the present invention.

SUMMARY OF THE INVENTION

It is therefore one object of the present invention to provide an improved lumber press apparatus which is capable of producing laminated lumber members in an efficient manner.

Another object of the invention is to provide such a lumber press apparatus in which the lumber members are held by side clamps which engage the opposite side edges of the lumber member at a raised position spaced above the lower press platens to enable additional lumber members to be fed onto such lower platens and glued to the raised lumber members.

A further object of the invention is to provide such a lumber press apparatus in which the upper press platens are adjustable in height to form laminated lumber members of different thicknesses.

An additional object of the present invention is to provide such a lumber press apparatus in which a plurality of lumber members are preheated, aligned and glued together automatically to form a laminated lumber member in a fast, accurate and inexpensive manner.

Still another object of the present invention is to provide such a lumber press apparatus in which the lumber members are preheated on a lower side thereof and inverted by a board turner apparatus to enable glue to be applied to the heated upper side of the lumber member before it is fed into the press for faster and more efficient gluing of the lumber member to previous lumber members held in such press.

A still further object of the invention is to provide such an improved lumber press apparatus in which the lower press platens have heaters for heating the bottom side of the lumber member before it is glued to the top side of the next lumber member fed into the press for better bonding.

A still additional object of the invention is to provide an improved board turner apparatus in which the turner fork mechanism is mounted on a pivot shaft which is reciprocated horizontally during rotation of the shaft to invert the board members while maintaining them in the same horizontal position to conserve space.

DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENT

Figure 1:
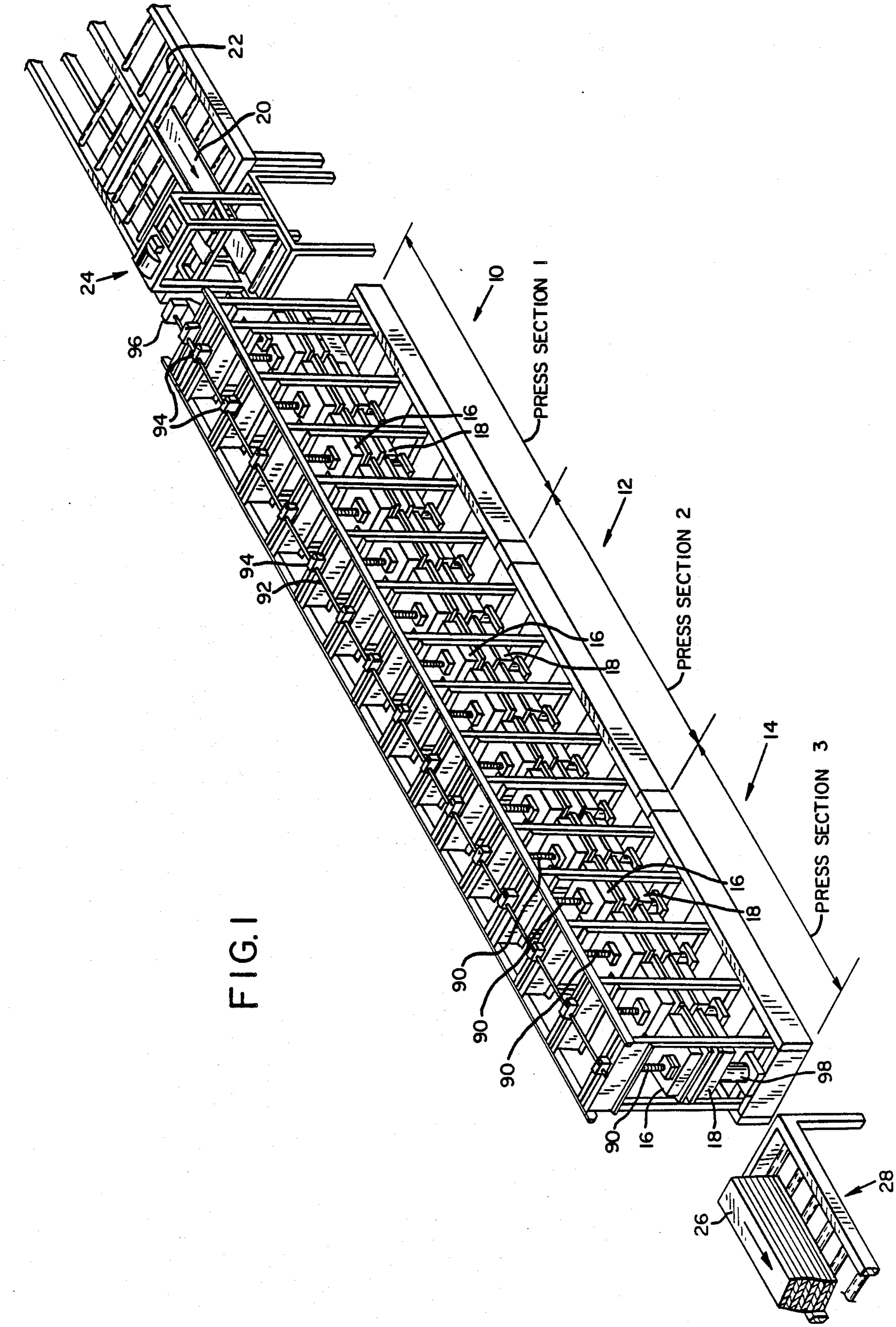
FIG. 1 is a oblique elevational view of the laminated lumber press apparatus of the present invention.

As shown in FIG. 1, the laminated lumber press apparatus of the present invention includes a first press section 10, a second press section 12 and a third press section 14 positioned in a line which each contain a plurality of pairs of upper and lower press platens 16 and 18. However, it should be noted that additional press sections may be employed depending upon the length of the laminated lumber member which is desired. Thus, up to eight press sections each ten feet long would be necessary to produce a laminated lumber member eighty feet in length. A board or other lumber member 20 is supplied by an input feed conveyor 22 which may employ powered rolls to propel the lumber member 20 into the press sections between the upper and lower press platens. A glue applicator 24 is provided at the outlet end of the feed conveyor 22 for applying a coating of glue to the top side of the lumber member 20 before it is fed into the press sections.

Figure 2:
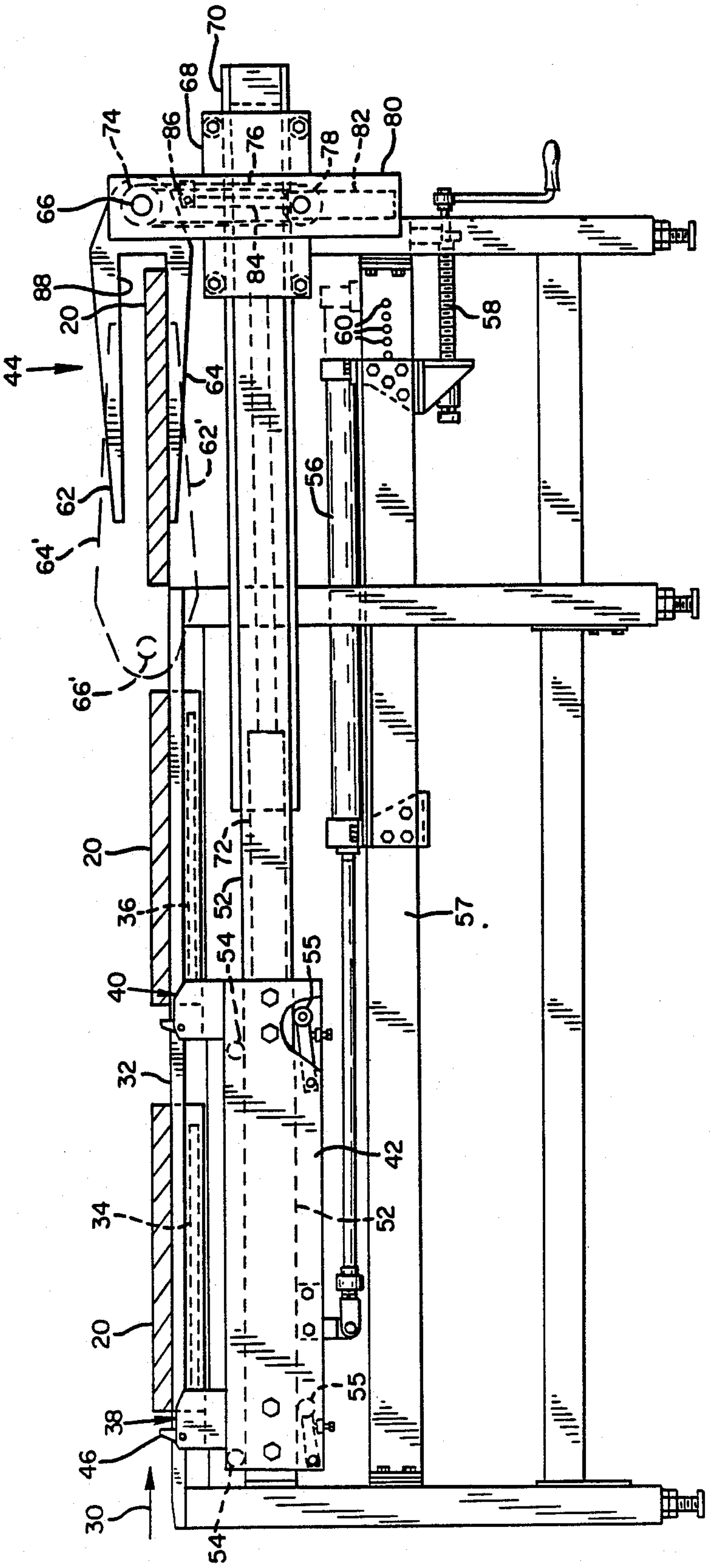
FIG. 2 is an enlarged end view of a feeder and board turner mechanism employed at the input of the press apparatus of FIG. 1.

A preheater table and board turner apparatus shown in FIG. 2 may be employed for preheating one side and inverting the heated side surface of the lumber member 20 to which the glue is to be applied. Such a preheater table and board turner apparatus discharges the preheated lumber member onto the feed conveyor 22 with the heated side up. After pressing and gluing the completed laminated lumber member 26 formed by the press apparatus is discharged from the output of the last press section 14 onto a discharge conveyor 28. The laminated lumber members 26 produced by the press apparatus may be of different vertical thickness depending upon the number of boards or lumber members 20 which are glued together to form such laminated lumber member. In addition, the size of the lumber members 20 may vary in thickness from 0.75 inch to 2.5 inches, and may vary in width from 12 inches to 24 inches, so that the size of the finished laminated lumber members 26 differ accordingly.

Figure 5:
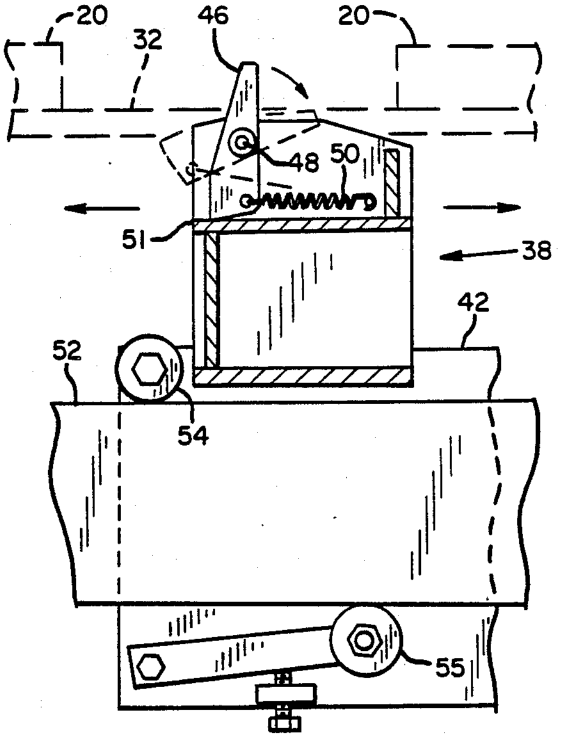
FIG. 5 is an enlarged partial section view of the dog means employed in the feeder of FIG. 2.

As shown in FIG. 2 the lumber members 20 may be first conveyed laterally in the direction of arrow 30 onto a preheat table 32 having two laterally spaced electrical heaters including a first heater 34 and a second heater 36 mounted beneath the surface of such table in order to heat the lower side of the lumber members resting thereon. A pair of resilient dog feeders 38 and 40 are provided on a feed carriage 42 for advancing the lumber members 20 into a board turner apparatus 44. The feeders 38 and 40 are similar in construction and both include a spring biased dog member 46 which pivots about a pivot pin 48 between a retracted position and an extended position as shown in FIG. 5. The dog 46 is resiliently held in the extended position above the top of the table 32 by the spring 50 which urges the lower end of the dog counterclockwise against a stop 51. The dog member 46 is cammed into the retracted position shown in dashed lines by engagement with the bottom surface by the board when the carriage 42 moves in the lateral direction to the left away from the board turner 44. The carriage is mounted on a track 52 by means of upper and lower carriage wheels 54 and 55 for sliding movement along such track. The dog carriage 42 is reciprocated back and forth along track 52 by a operating cylinder 56 whose piston rod is connected to such carriage and which is controlled by an electrically actuated valve to cause the lumber members 20 to be advanced intermittently from the first heater 34 to the second heater 36 and then into the board turner 44. The longitudinal position of the dog carriage operating cylinder 56 may be adjusted on a frame member 57 by means of a threaded crank shaft 58 and bolted at one of various adjustment holes 60 in the frame member.

As shown in FIG. 2 the board turner apparatus 44 includes a pair of turner arms 62 and 64 which are spaced apart sufficiently to provide a rectangular slot for receiving the lumber member 20 between such turner arms. The turner arms 62 and 64 are joined together at one end which is mounted on a pivot shaft 66. The board turner shaft 66 is mounted on a turner carriage 68 which slides along a second track 70 spaced laterally from the feeder track 52. As a result, the pivot shaft 66 of the board turner is reciprocated between the extreme right position 66 shown in solid lines and the extreme left position 66' shown in dashed lines along a reciprocating path of travel of the carriage 68 on track 70. A turner carriage operating cylinder 72 is mounted on the frame and has its piston rod connected to the turner carriage 68 for horizontal, reciprocal sliding movement of such carriage along such path on track 70 in order to move the board turner pivot shaft between the two positions 66 and 66' shown in FIG. 2.

The board turner 44 is pivoted 180° about the shaft 66 in order to invert or turn over the board or other lumber member 20. This causes the heated lower side of the board member 20 to be inverted so that it is on the top side of the board member when such board member is fed through the glue applicator 24 by the input feed conveyor 22 in FIG. 1. As a result, a glue coating is applied to the heated upper surface of the board member 20 before it is fed into press sections 10, 12 and 14 and bonded to the board members which are held in such press sections. The pivot shaft 66 of the board turner is rotated approximately 180° by a gear wheel 74 attached to such shaft and coupled by means of a chain 76 to an idler wheel 78 mounted on a shaft secured to a support arm 80 attached to the carriage 68. A turner rotation cylinder 82 is also mounted on the support arm 80 in position so that its piston rod 84 engages a connector 86 attached to the chain for reciprocating movement of the chain between the limits of extension and retraction of piston arm. This reciprocating movement is sufficient to rotate the gear 74 and the pivot shaft 66 through 180°, thereby inverting the board turner arms 62 and 64 once for each horizontal movement of the carriage 68 between extreme end positions 66 and 66' of the pivot shaft. As a result, the board 20 is inverted or turned over in the same horizontal position which conserves space and reduces the width of the turner apparatus. It should be noted that the turner arms 62 and 64 are separated by a U-shaped slot 88 having a width of 3½ inches which is greater than the maximum thickness of the board 20 and a length of about 20 inches in order to accommodate such board member.

Figure 3:
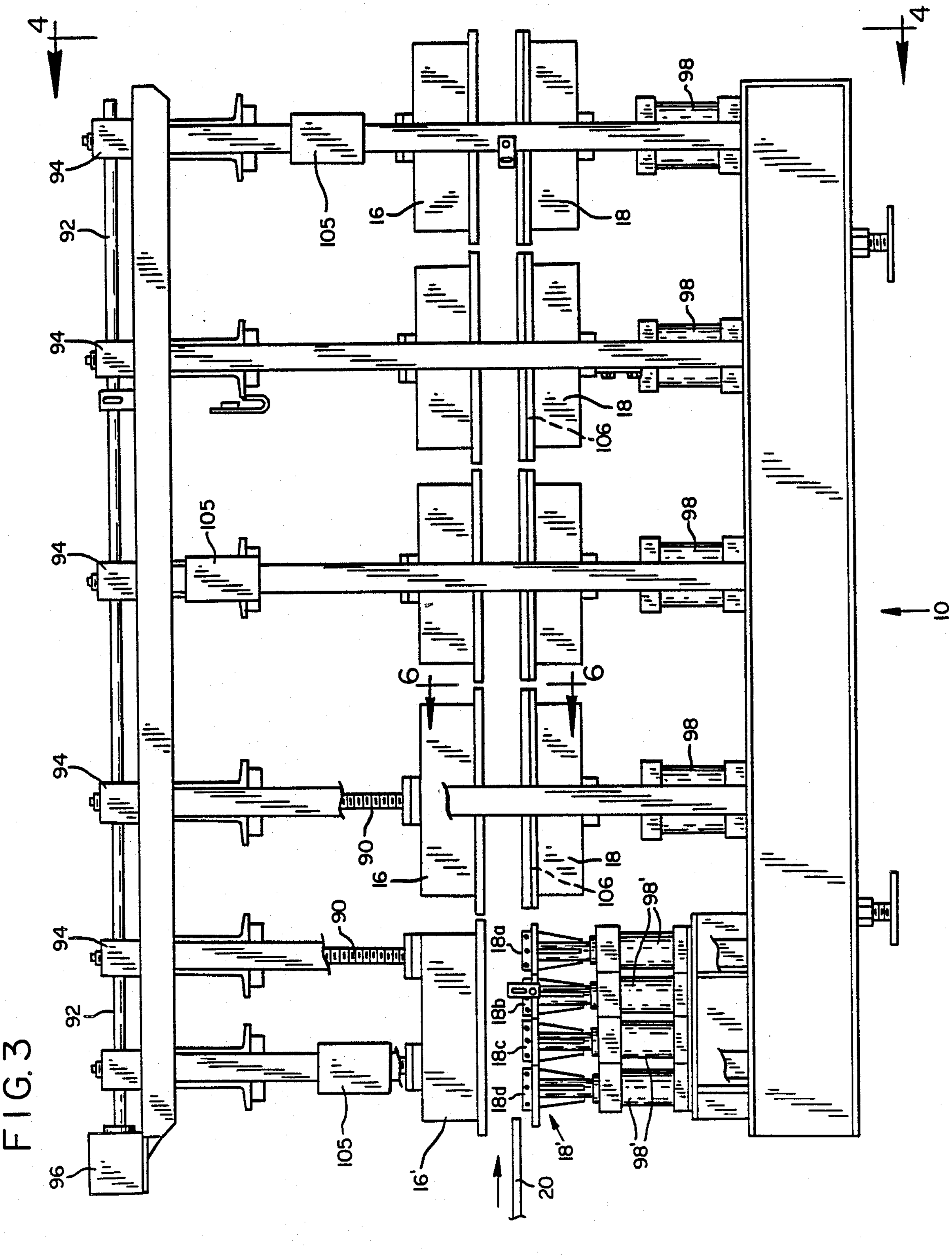
FIG. 3 is an enlarged side elevation view of the first press section of the press apparatus of FIG. 1.
Figure 4:
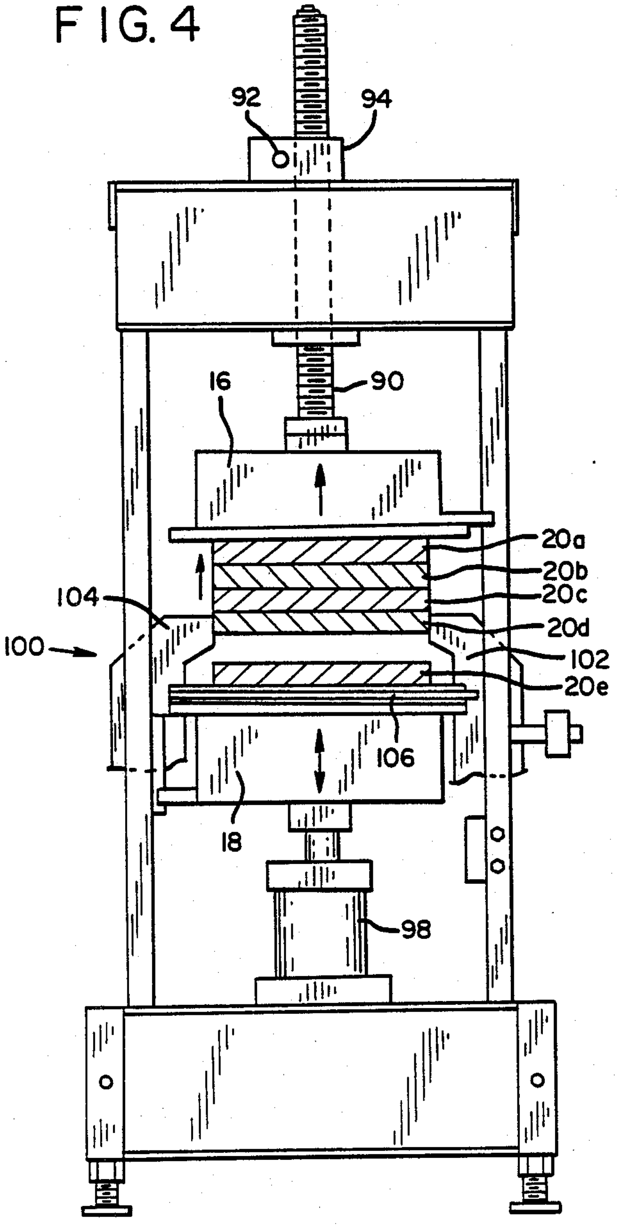
FIG. 4 is a end elevation view taken along the line 4—4 of FIG. 3.

As shown in FIGS. 3 and 4, the first press section 10 includes five pairs of press platens 16 and 18. The upper press platens 16 are each connected to a different adjustment shaft 90 for which contains a ball screw mechanism for vertical adjustment of the height of such upper platens to vary the spacing between the upper and lower platens in a range from 5½ to 19 inches. Each of these ball screw adjustment shafts 90 is coupled to a common drive shaft 92 by right angle gear couplings 94. The drive shaft is driven by an electric motor 96 attached to the end of such shaft, and the motor is controlled by a suitable automatic controller which adjusts the height of the upper platens 16 during the formation of the laminated lumber member. The lower press platens 18 are each mounted on the piston rod of a different actuating cylinder 98 which raises and lowers the lower press platen in order to raise the lumber member 20 resting on such platens upward during pressing into a raised position.

Figure 6:
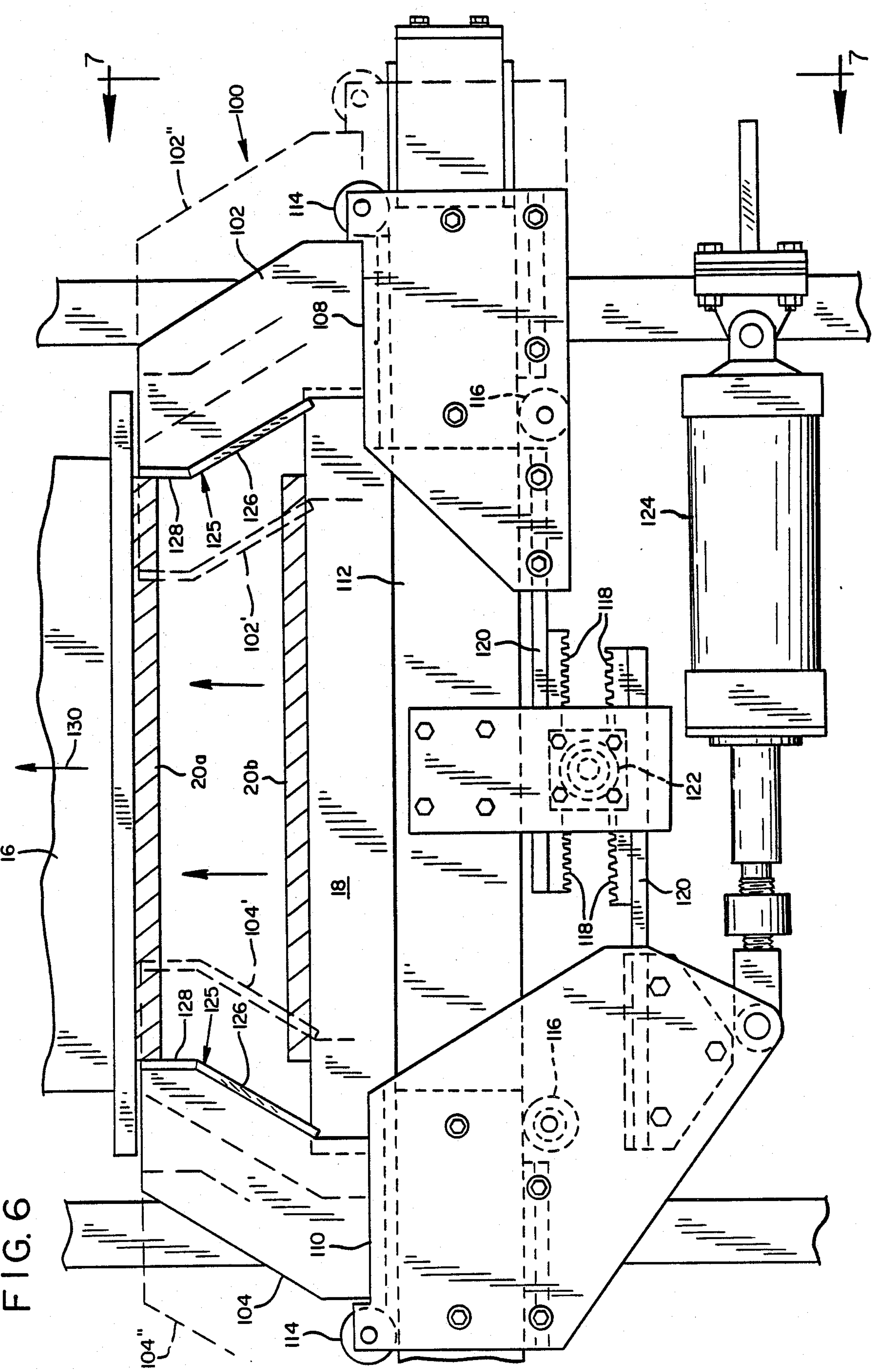
FIG. 6 is an enlarged vertical section view taken along the line 6—6 in FIG. 3 showing the side clamp device associated with the press platens.

In the raised position the lumber member 20 is held by a plurality of side clamps 100 shown in FIGS. 4 and 6, each including a pair of clamp jaws 102 and 104 which engage the opposite side edges of the lumber member. Each of the side clamps 100 are positioned between adjacent pairs of platens 16, 18 so that the clamp jaws 102 and 104 of the side clamp can extend between the pairs of platens to engage the lumber member 20 while it is supported on the lower press platen 18 in the raised position of such platen. In addition, the lower press platens 18 are each provided with an electrical heating element 106 may be energized to heat the lower side of the lumber member 20 as it is supported on the lower platen when the laminated lumber is formed of three or more lumber members, to assist in bonding such heated lumber member to another lumber member glued to such lower side.

FIG. 4 shows a five layer laminated wood member being formed, in which four lumber members 20A, 20B, 20C and 20D have already been glued together in a stack and the bottommost lumber member 20D of the stack is being held between the clamped jaws 102 and 104 in the raised position of such lumber member 20D after it has been pressed into such position by the lower platen 18. The fifth lumber member 20E is then raised by the lower press platen 18 into engagement with the bottom side of the lumber member 20D and is bonded thereto by the glue coating on the upper surface of lumber member 20E. In this regard, it should be noted that the bottom surface of the lumber member 20D has previously been heated by the heater 106 of the lower press platen 18 when it was carried by such press platen. Also the upper surface of the lumber member 20E has been heated by the heating elements 34 and 36 on the preheater table 32 and inverted by the board turner 44 to be located as such upper surface. Of course, a glue coating is applied to the heated upper surface of the lumber member 20E by the glue applicator 24 in FIG. 1. Once the final lumber member 20E is pressed upward and held for a sufficient time to glue it to the bottom of lumber member 20D, the laminated lumber member is complete. Then the clamp jaws 102 and 104 are released by lateral movement outward so that the laminated lumber member is supported solely by the lower press platens 18. Next, the lower platens retract downward, thereby lowering the laminated lumber member into the bottom position and causing it to be discharged onto the discharge conveyor 28 as laminated lumber member 26 in FIG. 1. Movement of the laminated lumber member 26 out of the press is achieved by means of pinch rolls (not shown) within the press which engage the side of the laminated lumber member and convey it outward in a conventional manner.

As shown in FIG. 3, the first pair of press platens 16' and 18' of the first press section 10 are somewhat different than the other pairs of press platens. Thus, while the upper press platen 16' of the first pair is similar to the previously described upper press platens 16, it is provided with two adjustment screw shafts 90 at the opposite ends thereto to maintain the upper platen 16' in contact with the lower plante 18'. Also the lower press platen 18' is divided into four platen segments 18A, 18B, 18C and 18D, each approximately six inches wide, while the remaining lower press platens 18 are approximately two feet wide. This separation of the lower platen 18' into four platen segments enables lumber members 20 of different length to be pressed and glued firmly together in the press apparatus. Thus, with two foot wide press platens only lumber members having their lengths in multiples of two feet could be pressed and glued together. However, by dividing the first press into four lower press platens 18' of six inches width, the lumber members can be of any length to the closest six inch dimension. In other words, a board 20½ feet long would overlap the first press platen 18A whereas a board 21 feet long would overlap the two press platens 18A and 18B of the first lower platen 18'. The length of the boards may be determined in any suitable manner such as by means of photoelectric cells 105 and associated light sources mounted on the press apparatus at positions spaced along its length. Also it should be noted that separate smaller platen cylinders 98' are connected to each of the four platens 18A, 18B, 18C and 18D, respectively.

Figure 7:
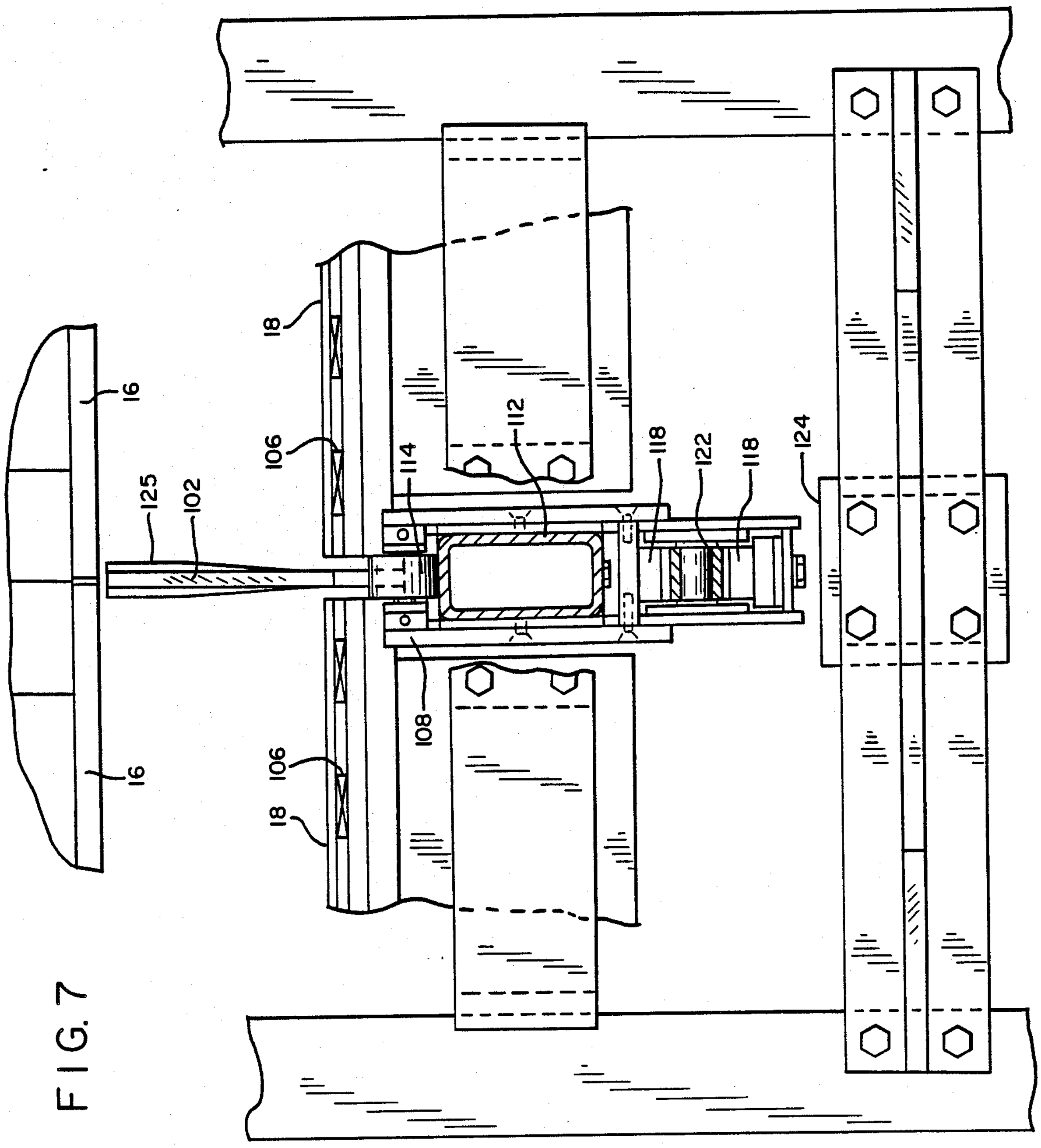
FIG. 7 is a vertical section view taken along the line 7—7 of FIG. 6 with parts broken away for clarity.

The side clamp 100 and its operation is shown in FIGS. 6 and 7. Each of the clamp jaws 102 and 104 is mounted on a separate carriage 108 and 110, respectively, which slide upon a common track 112 and are supported by carriage wheels 114 and 116 which engage the top and bottom, respectively, of the track. The carriages 108 and 110 are coupled together by a rack and pinion gear coupling including two racks 118 mounted on support arms 120 attached to the carriages and a pinion gear 122 which couple the rack members together. As a result, movement of the carriage 110 by an actuating cylinder 124 whose piston rod is connected to such carriage causes both of the carriages 108 and 110 and their clamp jaws 102 and 104 to move toward and away from each other. Each of the clamp jaws 102 and 104 are provided with a jaw face member 125 having guide portion 126 and a gripping portion 128 which extends at an obtuse angle to such guide portion. The guide portions 126 of jaws 102 and 104 are separated by a tapered spacing distance which gradually decreases with distance along the jaw face in the upward direction. Thus, the guide portions 126 align the lumber members 20 so that they are arranged in an aligned stack by the time they reach the clamp position and are engaged by the gripping portion 128 of the clamp jaws. The gripping portions 128 extend substantially vertically and are uniformly spaced from each other along their entire length so that such gripping portions engage the side edges of the lumber member to clamp it in position. The height of the gripping portion 128 is approximately equal to at least twice the maximum thickness of the lumber member 20 so that two lumber members may be simultaneously engaged by the gripping portions to clamp them between the clamp jaws 102 and 104. It should be noted that the lateral position of the clamp jaw 102 and 104 may be adjusted inwardly to the dashed line minimum spacing position 102' and 104' where they are separated by about 11½ inches to hold lumber members 20 of narrow width. In addition, the clamp jaws 102 and 104 are moved laterally apart into maximum spacing positions 102'' and 104'' where they are separated by about 25 inches to release the laminated lumber member once it is completely formed. As a result, the side clamps can clamp boards or other lumber members of between 12 inches and 24 inches in width.

It should be noted that the upper press platen 16 is moved upward during formation of the laminated lumber member by means of the adjustment screws 90 in order to accommodate laminated lumber members of different thickness. For example, in the embodiment shown in FIG. 4, five laminated lumber members 20A, 20B, 20C, 20D and 20E are glued together to form a completed laminated lumber member. This would require upward movement of the upper press platen 16 in the direction of arrow 130 from the position shown in FIG. 6 in order to accommodate the three additional lumber members 20C, 20D and 20E. It is important to note that the vertical position of the clamp jaws 102 and 104 does not change, and such clamp jaws are always positioned to engage the bottommost lumber member of the stack which is glued to the lumber members previously inserted into the press sections as shown in FIG. 4. Also, the outer edges of all of the lumber members 20A, 20B, 20C, 20D and 20E are all in alignment due to the aligning action of the alignment portions 126 of the jaw face members 125. Finally, it should be noted that the first lumber member 20A of the stack is not inverted by the board turner 44 so that its preheated surface is on its bottom side when such first lumber member is inserted into the press sections. Also, the first lumber member 20A is not coated with glue and the heater 106 of the lower platen is not energized when supporting such first lumber member.

It will be obvious to those having ordinary skill in the art that many changes may be made in the above described preferred embodiment of the present invention without departing from the spirit of the invention. For example, the upper platens of each of the press sections 12 and 14 could be made integral as one common upper platen for the section to reduce cost. Therefore, the scope of the present invention should only be determined by the following claims.

We claim:

1. Laminated lumber press apparatus, comprising:

a plurality of press sections each including lower press platen means and upper press platen means spaced above said lower platen means to provide a plurality of pairs of upper platen means and lower platen means spaced along the length of the press apparatus to enable the formation of laminated lumber of different lengths;

clamp means for engaging the opposite side edges of lumber members, each lumber member having a width many times greater than its thickness, to hold said lumber members in a raised position above said lower platen means, said clamp means including a plurality of pairs of clamp members each extending between adjacent pairs of upper and lower platen means;

conveyor means for conveying lumber members through said press sections and for positioning said lumber members on the lower platen means of said press sections spaced below the upper platen means;

glue application means for applying a coating of glue to at least one side of said lumber members; and press operation means for moving the lower platen means and upper platen means together to press a coated lumber member supported on said lower platen means into engagement with another lumber member held by the clamp means and thereby glue the lumber members together in a stack to form laminated lumber.

2. Press apparatus in accordance with claim 1 which also includes adjustment means for adjusting the position of the upper platen means to change the spacing between the lower platen means and the upper platen means to enable the laminated lumber to be formed of different thicknesses.

3. Press apparatus in accordance with claim 1 which also includes heater means for heating the lumber members when they are pressed into engagement by said upper and lower platen means.

4. Press apparatus in accordance with claim 3 in which the heater means includes electrical heating elements provided in the lower platen means.

5. Press apparatus in accordance with claim 1 in which the press operation means includes a fluid cylinder means for moving the lower platen means upward toward the upper platen means.

6. Press apparatus in accordance with claim 2 in which the adjustment means includes an adjustment screw means for adjusting the height of the upper platen means above the lower platen means.

7. Press apparatus in accordance with claim 1 in which the clamp means includes pairs of side clamp members and clamp operation means which moves each pair of clamp members into and out of engagement with the side edges of the lumber members.

8. Press apparatus in accordance with claim 7 in which the clamp operation means moves each pair of clamp members laterally to the lumber members in a direction substantially perpendicular to upward movement of the lumber member on the lower platen means during pressing.

9. Press apparatus in accordance with claim 1 which also includes preheating means for heating the lumber members before they are conveyed into the press sections.

10. Press apparatus in accordance with claim 9 which also includes lumber turner means for turning over the lumber member after it is preheated on one side so that its heated side is oriented upward before conveying the lumber member into the press sections.

11. Press apparatus in accordance with claim 10 in which the glue application means applies glue to the heated upper side of the heated lumber member before it is conveyed into the press sections.

* * * * *